July 1, 1941.   L. HARTMAN ET AL   2,247,809
SYNCHRONIZING APPARATUS
Filed April 1, 1939
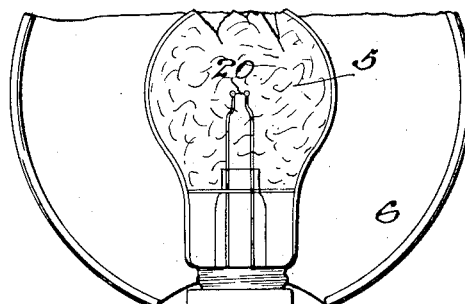
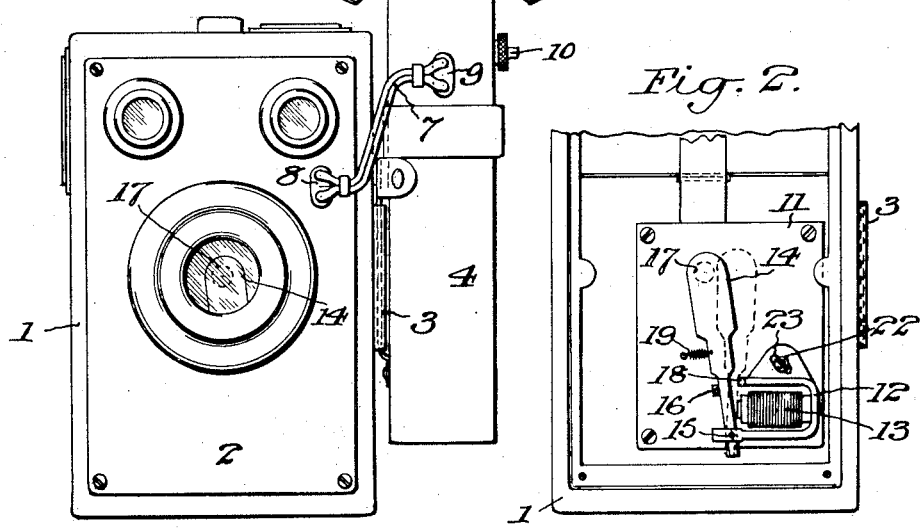
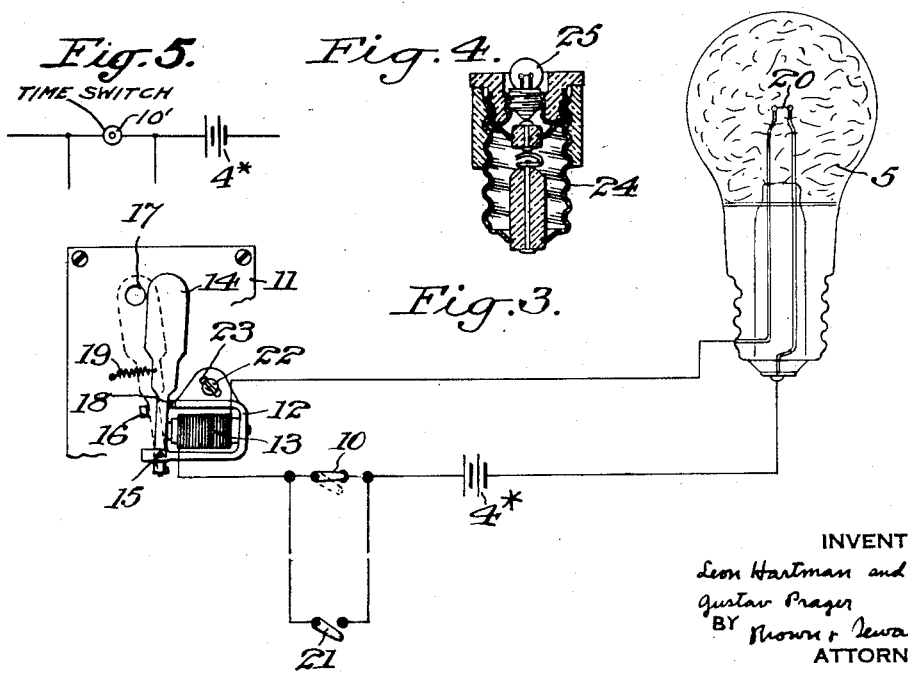
INVENTORS
Leon Hartman and
Gustav Prager
BY Brown & Seward
ATTORNEYS Patented July 1, 1941

2,247,809

UNITED STATES PATENT OFFICE 2,247,809

SYNCHRONIZING APPARATUS

Leon Hartman and Gustav Prager, New York, N. Y., assignors to Abbey Photo Corporation, New York, N. Y., a corporation of New York Application April 1, 1939, Serial No. 265,441

6 Claims. (Cl. 67—29)

This invention relates to a synchronizing apparatus for cameras, in which a shutter and a source of actinic light are operated electrically in proper synchronization to ensure the taking of a satisfactory picture.

An object of the invention is to provide electric means for operating the camera shutter and for setting off a flash bulb in automatic synchronization.

Another object of the invention is to provide an electrically operated shutter which is part of the armature of the electro-magnet operating it.

A further object of the invention is to provide synchronizing apparatus which can readily be applied to simple and inexpensive cameras of the box type, thus making it possible to obtain flashlight pictures of high quality with such cameras.

Further objects of the invention consist in providing certain improvements in the form, construction and arrangement of the several parts whereby the above mentioned and other objects may effectively be attained.

A practical embodiment of the invention is represented in the accompanying drawing, in which, Fig. 1 represents a front elevation of a box type camera having photo-flash apparatus mounted thereon and an electrically operated shutter embodied therein;

Fig. 2 represents a front elevation of the camera shown in Fig. 1, the face plate having been removed and parts being broken away;

Fig. 3 represents a wiring diagram of the synchronizing device;

Fig. 4 represents a vertical section through an adaptor socket which may be used in place of the flash bulb under certain circumstances which will later be described; and Fig. 5 is a fragmentary representation of a modified wiring diagram of the synchronizing device.

Referring to the drawing, a camera 1 of the box type having a removable face plate 2 is provided with a bracket 3 on one side for supporting a battery case 4 of a photo-flash device. This device is adapted to have a flash bulb 5 inserted in a socket at its upper end and a reflector 6 is also customarily provided. Connection between the battery case and the electric shutter operating mechanism is made by wires 7 which may be plugged into a socket in the face plate 2 as shown at 8 and may be plugged into a similar socket 9 in the battery case. An operating switch 10 is located at a convenient point on the battery case.

The shutter and its operating means are shown in Fig. 2 where it will be seen that a base plate 11 has mounted thereon a U-shaped frame 12 to which is secured a small electro-magnet 13. A shutter member 14 is pivoted at one end in the lower branch of the U-shaped frame 12, as shown at 15, and a stop 16 is provided so that the shutter member 14 will precisely cover the lens opening 17 when it is resting against the stop 16. The lower part of the shutter member is thickened to form an armature opposite the free end of the electro-magnet 13 and the upper branch of the U-shaped frame 12 forms a stop 18 to limit the movement of the shutter member toward the electro-magnet, while permitting sufficient movement in this direction to ensure opening of the lens, as shown in dotted lines in Fig. 2. A light spring 19 normally holds the shutter member in lens closing position but the force of this spring can be overcome by energizing the electro-magnet which will thus open the lens.

As shown in the diagram Fig. 3 the electromagnet 13 is connected in series with the photoflash bulb 5, in a circuit which includes the battery 4* and the switch 10.

In the operation of the camera to take a flashlight picture the bulb 5 is inserted in its socket, the switch 10 being open and the shutter member 14 being in lens closing position. When the switch 10 is closed the current passing through the circuit will cause the electro-magnet 13 to draw the shutter member into lens opening position, and will at the same time ignite the flash bulb 5. At a point which in practice has been determined to be only slightly before the peak of illumination of the bulb has been reached the filament 20 in said bulb will break, thus opening the circuit and permitting the shutter member to be drawn by the spring 19 back to lens closing position. The inertia of the shutter member will ordinarily be such that the lens will not be closed until the subject being photographed has received at least some of the benefit of the peak illumination from the flash bulb; and in any event sufficient illumination is provided up to the point of breakage of the filament to ensure satisfactory results. The spring 19 may be mounted for adjustment of its tension by any suitable means in order to ensure accurate operation of the apparatus.

While different flash bulbs are known to have different characteristic curves of illumination intensity it has been found that the point of breakage of the filament is substantially uniform in all such bulbs, so that the synchronization of the shutter operation with respect to the point of breakage of the filament gives uniform results with any type of flash bulb.

Remote control of the camera can be accomplished by means of an extension cord and remote switch 21 (Fig. 3) connected in parallel with the switch 10; this remote control making it possible, for instance, for the operator to include himself in the field of view of the camera when the exposure is made.

The scope of movement of the shutter member 14 between the stops 16 and 18 may be adjusted by means of a screw 22 which passes through a slot 23 and secures the U-shaped frame 12 to the base plate 11, adjustment of the frame and electro-magnet about the point 15 as an axis to different positions on the base plate serving to move the stop 18 toward or away from the stop 16, without changing the position of the shutter with reference to the lens opening.

In cases where a daylight exposure without the use of a flash bulb is desired, such a result can be accomplished by various means. One such means includes the use of an adaptor socket 24 containing a miniature bulb 25 of very low capacity, this socket being inserted in place of the flash bulb previously described. The miniature bulb 25 is of such a size that it will burn out immediately when the current from the operating battery is passed through it, the shutter operation in this case being the same as when a flash bulb is used.

A further important characteristic of the present invention resides in its usefulness in connection with bulbs whose filaments persist, whether intentionally or otherwise, without breaking when current is applied; such bulbs including photo-flood light bulbs having a life of several hours, and photo-flash bulbs in which the filament may, on rare occasions, fail to break. Most incandescent lamp bulbs of either type employ a tungsten filament which becomes heated by its resistance to the electric current and the resistance, in turn, has been found to vary with the different temperatures of the tungsten wire. According to Prof. Langmuir typical figures for this relationship are as follows:

| Temperature | Resistivity (Ohm/cm.) |
|---|---|
| Room temp.: | |
| 20° C | 5.51 |
| 727° C | 25.3 |
| 1227° C | 59.4 |
| 1727° C | 59.4 |
| 2727° C | 98.9 |
| 3237° C | 118.0 |

Since the resistivity of the filament when heated to the temperature of incandescence (at least 3000° C.) is about twenty times its resistivity at room temperature, it will be seen that a proper selection of the source of current and correlation with the holding power of the electro-magnet can readily produce a system in which the electro-magnet will release the shutter in response to the increase of resistance in the tungsten filament.

In some cases, and particularly where regular or frequent operation of the apparatus on the resistance principle is contemplated, it will be found desirable to substitute for the switch 10 a time switch of any convenient type as represented at 10' in Fig. 5 which will remain closed only for a predetermined period and will then open, so as to eliminate the possibility of the electro-magnet again receiving enough current to open the shutter and cause a double exposure. In the case of photo-flood bulbs where the exposure is of the order of one half second the switch could be set for a maximum of one second; and in the case of flash bulbs the setting need be for only one tenth to one twentieth second, since the ignition within the bulb starts with the passage of a minimum current and reaches its peak within a few thousandths of a second.

It will readily be seen that the apparatus described herein can easily be installed in place of the mechanical shutter in common and inexpensive types of box cameras and it has been found that the results obtained by the use of such cameras with this apparatus compared favorably with results heretofore only obtainable with much more expensive equipment.

It is evident that various changes may be resorted to in the construction, form and arrangement of the several parts without departing from the spirit and scope of the invention and hence we do not intend to be limited to the particular embodiment herein shown and described, but what we claim is:

1. Apparatus of the character described comprising, a shutter, means urging the shutter toward lens closing position, electric means for moving the shutter to lens opening position, a light source including an envelope having an igniting means therein for energizing said light source, an electric circuit including in series said electric means and said igniting means, means for closing said circuit, and means for producing in said circuit a current sufficient to actuate said electric means and to energize said igniting means, the resistance of said igniting means thereafter increasing to such an extent as to diminish said current to a point where it becomes insufficient to maintain said electric means in lens opening condition.

2. Apparatus according to claim 1 in which the electric means is an electro-magnet.

3. Apparatus of the character described comprising, a shutter pivotally mounted for movement into lens closing and lens opening positions, means urging the shutter toward lens closing position, electric means for moving the shutter to lens opening position, a light source including an envelope having an igniting means therein for energizing said light source, an electric circuit including in series said electric means and said igniting means, means for closing said circuit, and means for producing in said circuit a current sufficient to actuate said electric means and to burn out said igniting means whereby said circuit is broken and said electric means becomes inoperative to hold the shutter in lens opening position.

4. Apparatus according to claim 3 in which the electric means is an electro-magnet.

5. Apparatus of the character described comprising, a lens, a U-shaped frame mounted on the front of the camera adjacent said lens, a shutter pivotally mounted on one end of said frame for movement into lens closing and lens opening positions, a part of said shutter being positioned adjacent the other end of said frame member, means urging the shutter towards lens closing position, an electro-magnet mounted within said frame for moving the shutter to lens opening position, a light source including an envelope having an igniting means therein for energizing said light source, and an electric circuit connecting said electro-magnet and igniting means in series whereby to actuate said electro-magnet and energize said igniting means, the resistance of said igniting means thereafter increasing to such an extent as to diminish the current of said circuit to a point where it becomes insufficient to maintain said electro-magnet in lens operating condition.

6. Apparatus according to claim 1 in which the means for closing the circuit is a time switch manually operable to close said circuit for a predetermined time and to automatically open said circuit thereafter, independently of the condition of the igniting means.

LEON HARTMAN.
GUSTAV PRAGER.